United States Patent [19]

Takahashi et al.

[11] Patent Number: 4,677,377
[45] Date of Patent: Jun. 30, 1987

[54] POSITION-DETECTING SENSOR FOR DETECTING POSITION OF A MOVING OBJECT UTILIZING MAGNETISM

[75] Inventors: Tadashi Takahashi; Kunio Miyashita; Syoichi Kawamata, all of Hitachi, Japan

[73] Assignee: Hitachi, Ltd., Tokyo, Japan

[21] Appl. No.: 762,824

[22] Filed: Aug. 6, 1985

[30] Foreign Application Priority Data

Aug. 10, 1984 [JP] Japan ................. 59-166496

[51] Int. Cl.⁴ ............................ G01B 7/14; G01B 7/28
[52] U.S. Cl. ..................... 324/208; 324/252; 324/260; 338/32 R
[58] Field of Search ............ 324/207, 208, 225-227, 324/234, 228, 252, 260, 261, 262, 232; 338/32 R, 32 H; 340/870.31, 870.32, 870.35

[56] References Cited

U.S. PATENT DOCUMENTS

| 4,142,218 | 2/1979 | Gorter | 324/252 X |
| 4,251,795 | 2/1981 | Shibasaki et al. | 324/252 X |
| 4,255,708 | 3/1981 | Wilson, III | 324/252 X |
| 4,283,679 | 8/1981 | Ito et al. | 324/238 X |
| 4,296,377 | 10/1981 | Ohkubo | 338/32 R X |
| 4,319,188 | 3/1982 | Ito et al. | 324/173 |
| 4,506,220 | 3/1985 | Sawada et al. | 324/225 X |
| 4,589,038 | 5/1986 | Radtke | 324/207 X |
| 4,599,561 | 7/1986 | Takahashi et al. | 338/32 R X |

FOREIGN PATENT DOCUMENTS

| 2341088 | 3/1974 | Fed. Rep. of Germany | 324/225 |
| 3041041 | 5/1982 | Fed. Rep. of Germany | 324/207 |
| 27604 | 3/1981 | Japan | 324/207 |

Primary Examiner—Reinhard J. Eisenzopf
Assistant Examiner—Warren S. Edmonds
Attorney, Agent, or Firm—Antonelli, Terry & Wands

[57] ABSTRACT

A position-detecting sensor comprises a magnetic recording medium carried on a moving object and having a signal track recording a magnetic signal, a first MR element disposed nearby the magnetic recording medium and varying its internal resistance by sensing the magnetism of the magnetic recording medium, and a magnetic sensor electrically picking up resistance variation of the MR element and detecting the magnetic signal of the magnetic recording medium. In the position-detecting sensor, the present invention is arranged by providing a second magnetic signal track on the magnetic recording medium in addition to the signal track, disposing a second MR element nearby the second magnetic signal track. The variation of a gap between the magnetic recording medium and the magnetic sensor is detected as resistance variation of the second MR element. And the detected signal is serviceable as correcting the output picked up by the first MR element.

5 Claims, 7 Drawing Figures

POSITION-DETECTING SENSOR FOR DETECTING POSITION OF A MOVING OBJECT UTILIZING MAGNETISM

BACKGROUND OF THE INVENTION

1. Field of the Invention

The present invention relates to a position-detecting sensor and more particularly to a position-detecting sensor utilizing magnetism which is provided for detecting position of a moving object such as a rotor, or some other such object which changes its position.

2. Description of the Prior Art

With regard to a position-detecting sensor utilizing magnetism, the sensor described in U.S. Pat. No. 4,319,188 has been proposed. This U.S. patent describes a magnetic sensor comprised of a magnetic recording medium carried on a moving object (rotor) and a magnetic resistance-effect element disposed nearby this magnetic recording medium (hereinafter, referred to as an MR element.).

However, this magnetic sensor does not provide any design against output variation of the magnetic sensor which occurs where the gap between the magnetic recording medium and the MR element varies.

Accordingly, the output of a magnetic sensor varies in accordance with variation in spacing caused by deflecting the center of a rotor or the like. As a result, in a position-detecting sensor with a sine wave output, it is impossible to obtain a correct output conforming to a position, because the peak value of the sine wave varies.

SUMMARY OF THE INVENTION

Object of the Invention

It is an object of the present invention to provide a position-detecting sensor which can compensate so as not to change the analog value representing the position output from an MR element when changing the spacing of the gap between a magnetic recording medium carried on a moving object and a magnetic sensor disposed in opposition to this medium, and which can pick up an analogue signal when a spacing error occurs.

STATEMENT OF THE INVENTION

A position-detecting sensor of the present invention is used so as to detect a position of a moving object utilizing magnetism. The position-detecting sensor includes a magnetic recording medium carried on the moving object and having first and second signal tracks. A magnetic sensor has first and second resistance elements and is disposed in opposition to the magnetic recording medium with a spacing therebetween. The first magnetic resistance element is disposed near the magnetic recording medium and variations of its internal resistance are caused by sensing the magnetism of the magnetic recording medium. The second magnetic resistance element is disposed near the first magnetic resistance element and variations of its internal resistance is also caused by sensing the magnetism of the magnetic recording medium. The first signal track has recorded thereon a first magnetic signal. The first magnetic resistance element provides a first output in response to the position of the moving object by detecting the first magnetic signal. The second signal track has recorded thereon a second magnetic signal. The second magnetic resistance element provides a second output in response to change of the spacing between the magnetic sensor and the magnetic recording medium by detecting the second magnetic signal. A corrected output is then obtained by controlling the first output of the first signal track with the second output of the second signal track.

More particularly, the present invention further provides a second MR element in addition to the first MR element to detect a spacing which is in response not to position information, but to spacing variation, and to correct the output of the first MR element for position-detecting by means of the output of said second MR element.

DESCRIPTION OF THE PREFERRED EMBODIMENT

Hereinafter, each embodiment of the position-detecting sensor of the present invention is described with reference to each drawing.

Figure 1:
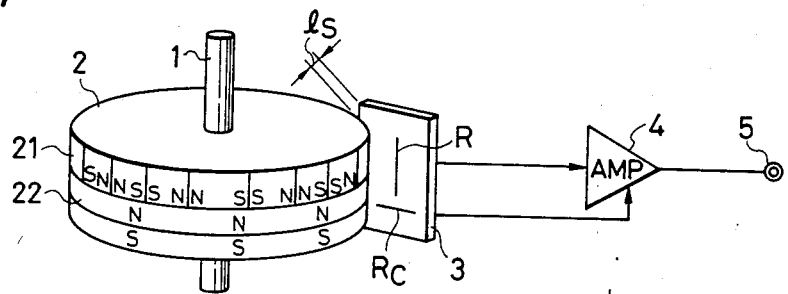
FIG. 1 is a schematic arrangement view of a position-detecting sensor which is one embodiment of the present invention.
Figure 2A:
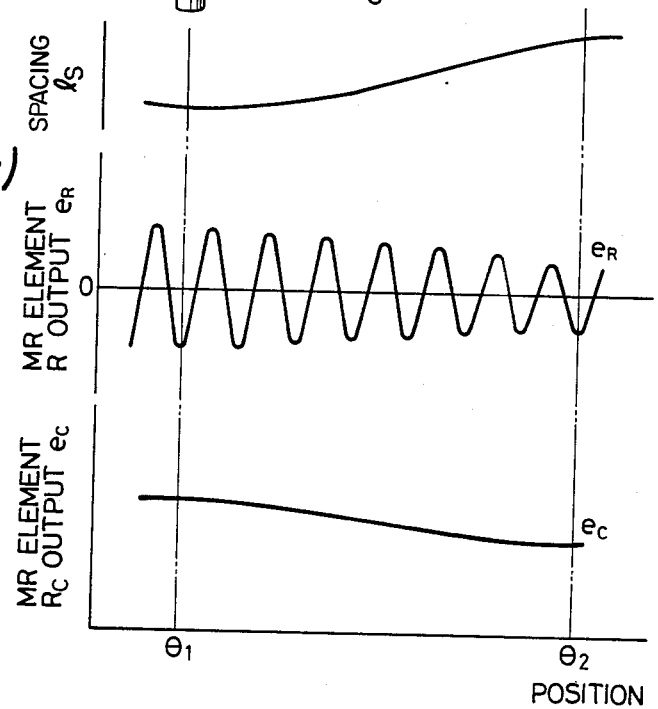
FIG. 2(a) is an explanatory view of the waveform thereof.
Figure 2B:
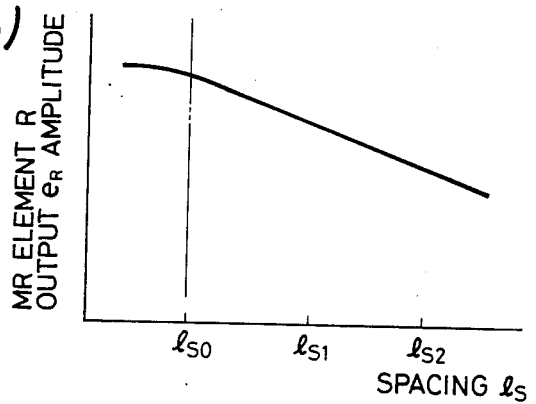
FIG. 2(b) is an explanatory view showing the relation between a peak value of an output of a magnetic resistance element and a spacing.
Figure 3:
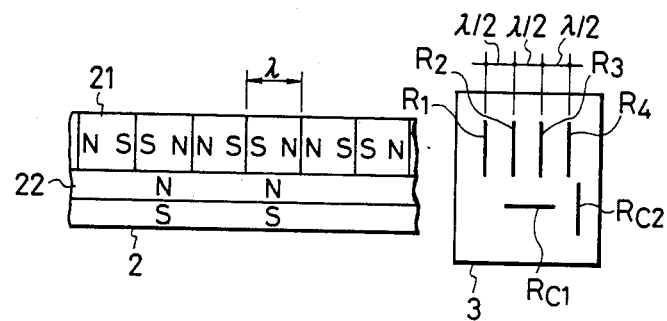
FIG. 3 is an enlarged expansion view showing an expanded part of FIG. 1.
Figure 4:
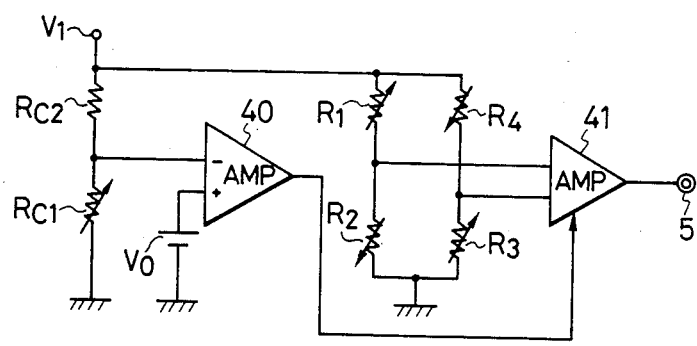
FIG. 4 is an electrical connection diagram of the magnetic sensor.

FIG. 1 is a schematic arrangement view of a position-detecting sensor according to one embodiment of the present invention. FIG. 2(a) is an explanatory view of the waveform thereof. FIG. 2(b) is an explanatory view showing the relation between an output peak value of a magnetic resistance element and a spacing. FIG. 3 is an enlarged expansion view showing an expanded part of FIG. 1. FIG. 4 is an electrical connection diagram of a magnetic sensor in the position-detecting sensor.

In the present embodiment, the moving object is a rotor.

In the drawings, a rotating shaft 1 in a rotating object is directly connected to a magnetic drum 2 which is a magnetic recording medium. This magnetic drum 2 includes two magnetic recording tracks, that is, first and second signal tracks 21, 22 on a non-magnetic surface.

On the first signal track 21, S and N magnetic signals are alternately and continuously recorded at intervals of a recording pitch λ in the circumferential direction. And on the second signal track 22, the S and N magnetic signals are sequentially recorded on the overall circumference in the axial direction.

A magnetic sensor 3 is disposed in opposition to this magnetic drum 2 with a spacing $l_s$ therebetween.

This magnetic sensor 3 consists of two parts.

Namely, one part is constructed by disposing a long first MR element R on the portion in opposition to the first signal track 21 of said magnetic drum 2 in the axial direction. The other part is constructed by disposing a long second MR element $R_c$ in opposition to said second signal track 22 in the circumferential direction.

These magnetic resistance elements R and $R_c$ respectively exhibit variations in their resistances upon application of a magnetic field perpendicular to their respective longitudinal directions.

In the construction stated above, when the magnetic drum 2 is rotated, there is applied to the MR element R a magnetic field conforming to a magnetic signal recorded on the first signal track 21 of the magnetic drum 2.

Consequently, the resistance of the MR element R is varied. Thus, due to current flowing through this MR element R, a voltage variation conforming to the rotation of the magnetic drum 2 is generated. This voltage variation is amplified by an amplifier 4 and the output conforming to the rotation of the magnetic drum 2 can then be obtained at an output terminal 5.

The magnitude of the magnetic field to the MR element R can be altered by varying the spacing $l_s$.

Thus, as the spacing $l_s$ widens, the intensity of the magnetic field applied to the MR element R decreases, and as the spacing $l_s$ narrows, the intensity of the magnetic field applied to the MR element R increases.

Further, the MR element $R_c$ in opposition to the second signal track 22 of the magnetic drum 2 does not serve to vary its resistance when the magnetic drum 2 rotates because the magnetic field from the magnetic drum 2 does not vary when constant spacing is maintained.

However, the spacing $l_s$ varies as the magnetic drum 2 rotates due to factors such as the working accuracy of the magnetic drum, or the long axis of the magnetic drum 2 being off center.

When the spacing $l_s$ increases, the intensity of the magnetic field applied to the MR element R decreases or weakens. Therefore, the resistance variation of the MR element R becomes small, and the output $e_R$ of the MR element R lowers. Similarly, when the spacing $l_s$ increases, the output $e_c$ of the MR element $R_c$ lowers. Accordingly, the change of spacing $l_s$ can be detected by detecting the resistance variation of the MR element $R_c$.

Similarly, there appears at the output $e_r$ of the MR element R the variation conforming to the variation of the spacing $l_s$ in the state of overlapping the variation caused by the magnetic signal therewith. When the spacing $l_s$ is wide, the output of respective magnetic resistance elements $R_c$ and R are similarly lowered as shown at $\theta_2$ point of FIG. 2(a), and both outputs $e_c$, $e_R$ are increased at the $\theta_1$ point of the narrow spacing.

The relation between the peak value of the output $e_R$ of the MR element R and the spacing $l_s$ is shown in FIG. 2(b).

When the spacing $l_s$ is over a certain value, the MR elements R and $R_c$ are saturated and the sine wave of the output is distored. Thus, the spacing should be defined over the value of $l_{so}$. The relation between the MR element $R_c$ and the spacing $l_s$ is the same as the relation shown in FIG. 2(b).

Accordingly, if an amplification factor of the amplifier 4 for amplifying the output $e_R$ of the MR element R shown in FIG. 1 is controlled by the output $e_c$ of the MR element $R_c$, it is possible to obtain a value which can correct variation of the spacing $l_s$ and which is not affected by the long axis of the magnetic drum 2 being off center as FIG. 3 is an expansion view for more particularly describing the magnetic drum 2 and the magnetic sensor 3 shown in FIG. 1.

On the first signal track 21 of the magnetic drum 2, the N and the S magnetic signals are alternately recorded at intervals of a recording pitch $\lambda$. MR elements $R_1$–$R_4$ conforming to said MR element of the magnetic sensor 3 in opposition to said magnetic drum 21 are arranged so as to maintain the distance $\lambda/2$ between respective elements in comparison with the recording pitch $\lambda$. Further, on the second signal track 22 of the magnetic drum 2, the N and the S magnetic signals are endlessly recorded in the direction perpendicular to the magnetic signal of the first signal track 21. In opposition to said second signal track 22, there is arranged a MR element $R_{c1}$ conforming to said MR element $R_c$. A MR element $R_{c2}$ is arranged in the direction perpendicular to said MR element $R_{c1}$. The magnetic signal recorded on the second signal track 22 is arranged so as to be detect only, by the MR element $R_{c1}$.

This magnetic sensor 3 should be connected as shown in FIG. 4.

Namely, the MR elements $R_{c2}$ and $R_{c1}$ are connected in series between a certain voltage $V_1$ and ground. The output is obtained midway between them and the output is then added to an inversion input of amplifier 40. The magnetic field from the second track 22 is effectual for the MR element $R_{c1}$ but is not effectual for $R_{c2}$. The non-inversion input of the amplifier 40 is amplified by adding a bias voltage $V_0$ thereto.

The constant voltage $V_1$ is connected in series with respective groups of MR elements $R_1$, $R_2$, and $R_4$, $R_3$ so as to arrange a resistance-bridge.

The output of this bridge is amplified by the amplifier 41 so as to obtain a signal at an output terminal 5.

This amplifier 41 is arranged as shown in the Figure so as to control its amplification factor by means of the output of said amplifier 40.

The MR elements $R_1$, $R_3$ and $R_2$, $R_4$ differ from each other by a pitch of $\lambda$. Thus, the rotation of the magnetic drum 2 serves to vary the outputs in the same phases of respective groups of elements. As a result, it is possible to obtain a large output voltage as the output of the bridge composed of the MR elements $R_1$ to $R_4$.

Figure 5:
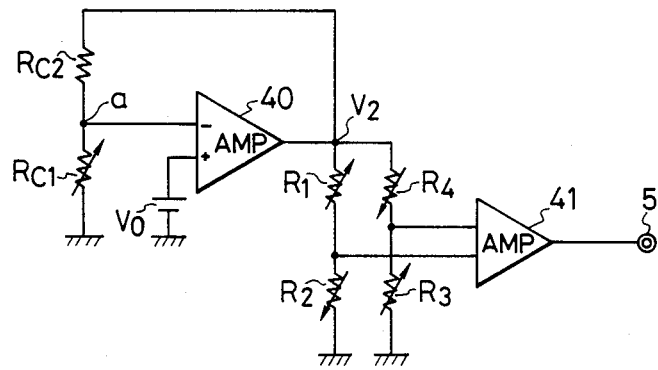
FIG. 5 is an electrical connection diagram of the magnetic sensor of another embodiment.

Next, FIG. 5 is an electrical connection diagram showing another embodiment of the magnetic sensor for arranging a position-detecting sensor.

In this embodiment, the MR elements $R_1$ to $R_4$ and $R_{c1}$, $R_{c2}$ shown in FIG. 3 are connected as shown in FIG. 5.

The series-connection of the MR elements $R_{c2}$ and $R_{c1}$, that of $R_1$ and $R_2$ and that of $R_4$ and $R_3$ are connected between an output terminal of the amplifier 40 and the ground. A middle terminal between the MR elements $R_{c2}$ and $R_{c1}$ is added to an inversion input of the amplifier 40. And a bias voltage $V_0$ is added to a non-inversion input terminal of the amplifier 40.

The magnetic field from the second signal track 22 of the magnetic drum 2 is effectual for the MR element $R_{c1}$ but is not effectual for the MR element $R_{c2}$, because the magnetic field is operated in the longitudinal direction.

Accordingly, when the spacing $l_s$ increases because the long axis of the magnetic drum 2 is off center, the intensity of the magnetic field to the MR element $R_{c1}$ is made weaker and the resistance value is raised. As a result, the voltage at the middle terminal a is raised and the output voltage of the amplifier 40 is lowered.

Consequently, the voltage at the middle terminal a is also lowered so as to return to the original state.

When the spacing $l_s$ is made wider, the magnetic field applied from the first signal track 21 to the MR elements $R_1$ to $R_4$ is made weaker and thus the voltage obtained at the output terminal of the bridge composed of the MR elements $R_1$ to $R_4$ is made lower. However, since the output of the amplifier 40 is raised as described above, it is possible to prevent the lowering of the voltage at the output terminal of the bridge. When the spacing $l_s$ is made narrower, the opposite effect occurs. Namely, the output $V_2$ of the amplifier 40 is lowered to prevent the rise of the output voltage of the resistance bridge. As a result, the operation is accomplished so as to always obtain a constant output.

Figure 6:
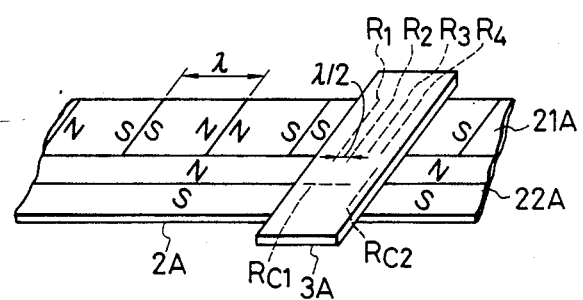
FIG. 6 is a schematic partial arrangement view of a position-detecting sensor of another embodiment.

Next, FIG. 6 is a schematic partial arrangement view showing another embodiment of the position-detecting sensor.

The present embodiment relates to position-detecting for a moving object displaced by linear movement or the like.

Namely, a moving object carries a magnetic recording medium 2A having two signal tracks on the surface thereof, where on a first track 21A, the N and the S magnetic signals are recorded at the pitch of λ in the direction of movement and on a second signal track 22A, the N and the S magnetic signals are recorded in the direction perpendicular to the direction of movement.

And, a magnetic sensor 3A is fixed in opposition to the two signal tracks. MR elements $R_1$ to $R_4$ are disposed at the position in opposition to the first signal track 21A and have an interval of λ/2 between respective elements. MR elements $R_{c1}$ and $R_{c2}$ are disposed opposite to the second signal track 22A.

The movement of the magnetic recording medium 2A is made identical with the rotation of the magnetic drum 2 shown in FIG. 3. Further, the circuit shown in FIG. 4 or 5 serves to keep an output as being constant against the variation of the spacing $l_s$, similarly with the above.

In this embodiment, the magnetic signal is recorded on the magnetic recording medium 2A and the magnetic sensor 3A is fixed. Conversely, it is possible to carry the magnetic sensor 3A on the moving object and to fix the recorded part of the magnetic signal so as to obtain a quite identical effect with the above.

Moreover, in the respective above-stated embodiments, the second signal track carried on the magnetic recording medium is designed to record the magnetic signal in the direction different from that of the magnetic signal of the first signal track, but it is possible to record the magnetic signal in the same direction as that of the first signal track.

Namely, as stated above, the magnetic signals are recorded on both of the tracks in the same directions and the MR elements for position-detection and spacing-detection in the magnetic sensor are disposed in the same directions.

And, the output of the MR element for spacing-detection is passed through a peak-value-detection circuit. By means of the output of this detection circuit, the output of the MR element for position-detection is designed to be corrected so as to realize the same effect as the case of recording the magnetic signals in different directions.

Further, in respective embodiments, the first and the second MR elements are designed to be disposed within one chip, but they can be respectively disposed within separate chip.

Generally a magnetic position-detecting sensor constructed as above serves to pick up a pulse train corresponding to the position as a digital signal.

However, there is a discontinuous state between respective pulses in the digital output.

Currently, an encoder with a sine wave output has been employed for the method of hightening resolution by further dividing the interval between respective pulses.

This encoder serves to shape a sine wave output so as to obtain a digital output by means of a zero cross of the sine wave output and simultaneously to detect the interval between digital outputs as an analog quantity and, on the basis of the magnitude of the analog quantity, detects the position by the following formula;

$$\theta = \sin^{-1}(e/e_m)$$

where $\theta$ denotes rotation position, e denotes magnitude of the analog quantity and $e_m$ denotes a peak value of a sine wave output.

The above-stated formula requires the peak value $e_m$ of a sine wave output not to vary in the overall region for position-detection. The present invention stated above completely satisfies this requirement.

As described above, the present invention can provide a position-detecting sensor which can compensate so as not to vary the analog value corresponding to the position output from a magnetic resistance element for position-detection if the gap between the magnetic recording medium recording the magnetic signal and the magnetic sensor disposed in opposition to the medium varies, and which can obtain a stable output if an error occurs in the spacing of the gap during operation.

We claim:

1. A magnetic position-detecting sensor for detecting a position of a moving object utilizing magnetism comprising:

a magnetic recording medium carried on the moving object and having first and second signal tracks;

a magnetic sensor having first and second magnetic resistance elements disposed in opposition to said magnetic recording medium with a spacing therebetween;

said first magnetic resistance element being disposed nearly said magnetic recording medium and varying its internal resistance by sensing the magnetism of said magnetic recording medium;

said second magnetic resistance element being disposed nearby said first magnetic resistance element and varying its internal resistance by sensing the magnetism of said magnetic recording medium;

said first signal track having recorded thereon a first magnetic signal, said first magnetic resistance element detecting said first magnetic signal and providing a first output indicative of a position of the moving object;

said second signal track having recorded thereon a second magnetic signal, said second magnetic resistance element detecting said second magnetic signal and providing a second output indicative of changes in the spacing between said magnetic recording medium and said magnetic sensor;

wherein said second output of said second magnetic resistance element enables correction of variations in said first output of said first magnetic resistance element due to said changes in the spacing between said magnetic recording medium and said magnetic sensor.

2. A position-detecting sensor according to claim 1, wherein said second signal track is designed to record the second magnetic signal in a different direction from that of the first magnetic signal of said first signal track.

3. A position-detecting sensor according to claim 1, wherein said second signal track serves to record the second magnetic signal in the direction perpendicular to the first magnetic signal recorded on said first signal track.

4. A position-detecting sensor according to claim 2, wherein the second magnetic signal recorded on said second signal track is a continuous signal with no gaps in the track direction.

5. A position-detecting sensor according to claim 1, wherein said first magnetic resistance element and said second magnetic resistance element are disposed respectively within one chip.

* * * * *